(12) United States Patent
Funk et al.

(10) Patent No.: US 11,983,194 B2
(45) Date of Patent: *May 14, 2024

(54) INTERACTIVE DYNAMIC GEO-SPATIAL APPLICATION WITH ENRICHED MAP TILES

(71) Applicant: Palantir Technologies Inc., Palo Alto, CA (US)

(72) Inventors: Benjamin Funk, London (GB); Andrei Alexandrescu, Brasov (RO); Austin Czarnecki, London (GB); Nicolas Jacques Marcel Legroux, Paris (FR); Quentin Devillechabrolle, Paris (FR)

(73) Assignee: Palantir Technologies Inc., Denver, CO (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/810,728

(22) Filed: Jul. 5, 2022

(65) Prior Publication Data

US 2022/0335057 A1  Oct. 20, 2022

Related U.S. Application Data

(63) Continuation of application No. 17/455,591, filed on Nov. 18, 2021, now Pat. No. 11,416,514.
(Continued)

(51) Int. Cl.
*G06F 16/26* (2019.01)
*G06F 16/22* (2019.01)
(Continued)

(52) U.S. Cl.
CPC .......... *G06F 16/26* (2019.01); *G06F 16/2237* (2019.01); *G06F 16/248* (2019.01); *G06F 16/252* (2019.01); *G06F 16/29* (2019.01)

(58) Field of Classification Search
CPC .... G06F 16/26; G06F 16/2237; G06F 16/248; G06F 16/252; G06F 16/29; G06F 16/9538; G06F 16/9537
See application file for complete search history.

(56) References Cited

U.S. PATENT DOCUMENTS

| 9,529,823 B2 | 12/2016 | Voinea et al. |
| 10,706,434 B1 | 7/2020 | Brainard et al. |

(Continued)

FOREIGN PATENT DOCUMENTS

| EP | 3547153 | 10/2019 |
| EP | 4002162 | 5/2022 |

OTHER PUBLICATIONS

U.S. Pat. No. 11,416,514, Interactive Dynamic Geo-Spatial Application With Enriched Map Tiles, issued Aug. 16, 2022.
(Continued)

*Primary Examiner* — Yuk Ting Choi
(74) *Attorney, Agent, or Firm* — Knobbe, Martens, Olson & Bear, LLP

(57) ABSTRACT

Systems and methods for preparing and analyzing data related to geo-spatial properties. A system generates from a first data source, based on an ontology, a geographic dataset including first data objects representative of first data from the first data source and at least one geo-spatial reference based on respective location information from the first data source that corresponds to the first data. The system can also generate a vector map data tile layer based on the ontology using the geographic dataset and including vector map data tiles, having map geometry data linked to the first data objects by a geo-spatial reference, and corresponding to a portion of a geographic area represented by the vector map data tile layer. In response to requests from the front-end system application for first data related to a geo-spatial feature, tiles can be provided and first data corresponding to selected geo-spatial references can be displayed.

16 Claims, 10 Drawing Sheets

Related U.S. Application Data

(60) Provisional application No. 63/116,639, filed on Nov. 20, 2020.

(51) Int. Cl.
*G06F 16/248* (2019.01)
*G06F 16/25* (2019.01)
*G06F 16/29* (2019.01)

(56) References Cited

U.S. PATENT DOCUMENTS

| | | | |
|---|---|---|---|
| 10,984,039 B2 * | 4/2021 | Asadi | G06F 16/9537 |
| | | | 715/748 |
| 11,416,514 B2 | 8/2022 | Funk et al. | |
| 2006/0268406 A1 * | 11/2006 | McMahon | G06F 16/29 |
| | | | 359/485.01 |
| 2008/0059889 A1 * | 3/2008 | Parker | G06F 16/29 |
| | | | 715/748 |
| 2010/0321399 A1 | 12/2010 | Ellren et al. | |
| 2017/0052654 A1 | 2/2017 | Cervelli et al. | |
| 2017/0337237 A1 | 11/2017 | State et al. | |
| 2017/0357668 A1 | 12/2017 | Fortin et al. | |
| 2018/0121442 A1 * | 5/2018 | Asadi | G06F 16/29 |
| | | | 715/748 |
| 2019/0128679 A1 * | 5/2019 | Thompson | G01C 21/3881 |
| | | | 715/748 |
| 2019/0242719 A1 | 8/2019 | Cervelli et al. | |
| 2020/0371993 A1 * | 11/2020 | Briseno | G06F 16/134 |
| | | | 715/748 |

OTHER PUBLICATIONS

Official Communication for European Patent Application No. 21209338.9 dated Mar. 15, 2022, 9 pages.

* cited by examiner

800 →

805 — Generate from a first data source a geographic dataset based on an ontology, the geographic dataset including first data objects representative of first data from the first data source, each first data object having a geo-spatial property based on respective location information from the first data source that corresponds to the first data

810 — Generate a first vector map data layer based on the ontology using the geographic dataset, the first vector map data tile data layer including map data tiles having map geometry data associated with the first data objects, each map data tile corresponding to a portion of a geographic area represented by the first vector map data layer

815 — Generate a mapping between geo-spatial features in a front-end user display system application and map geometry data in the first vector map data layer

820 — In response to a request from the front-end system application for first data related to selected map geometry data which corresponds to one or more geo-spatial features displayed by the user application and selected by the user, generate and provide one or more enriched map data tiles of the first vector map data layer to the front-end system, the enriched map data tiles including map geometry data and information from first data objects that are associated with the selected map geometry data by the ontology

FIG. 8

INTERACTIVE DYNAMIC GEO-SPATIAL APPLICATION WITH ENRICHED MAP TILES

REFERENCE TO PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data analysis and visualization. More specifically, this disclosure relates to ontology-based and content-based queries for analyzing and displaying data configurable charts and visualizations.

BACKGROUND

Analysis of data with respect to geographic areas may have many business and social applications. Such data typically has a location property and attributes. An ontology includes stored information that provides a data model for storage and association of such data in one or more databases. In many applications, it is beneficial to treat single geo-spatial objects displayed on a map as ontological entities that can be interacted with by an analyst. For example, on a map-related user application it can be useful to be able to select a displayed geo-spatial feature (e.g., a border/boundary of a neighborhood, community, town, city, county, district, region, state, country, continent, or hemisphere) and have information available that relates to the selected feature, or as an aggregate sum of selected features. However, users who define custom vector layers, but who are not GIS experts, can find it difficult to take a large amount of geo-spatial GIS data (millions of shapes) and properly place it on a map at scale. Also, some external data that relates to map geometries is desired to be accessed by an analyst but may not exist as vector map tiles that can be provided for a geographic area, nor is the external data referenced by an ontology. Enriching existing vector tiles "on-the-fly" with desired external data could allow use of such external data sets in a geo-spatial application. It would be beneficial to simplify defining a data vector layer to be as easy as "point to this dataset with this data" where the underlying information to handle such tasks is generated by backend services transparent to the user. In addition, it would be beneficial to be able to present geo-spatial related data with a time dimension on selected map geometries to identify changes that occur over time. However, there is no system to adequately generate and provide such custom ontological vector map tiles layers from an existing geo-spatial dataset such that an analyst can select any defined map geometry or shape and be provided information available to the selected geometry.

SUMMARY

Software application and user interfaces for defining custom vector layers to take a large amount of geometric-shaped GIS data and display it on a map, or on a geographic area representative of a map (both generally referred to herein as a map), and at scale. The software application on a frontend system has the ability to treat geo-spatial features, which may be one or more single objects displayed on the map, as logical entities that can be interacted with through the rest of a data analysis system. The software application can display information representative of a period of time to explore states, characteristics, or attributes of things, events, etc. (e.g., people, nature, man-made structures, vegetation, farming, fires, flooding, weather, and the like) in a geographic area at various points in time. High-scale structured shape data (e.g., map geometry data) is derived via data pipelines where a data source is processed to yield ontological geographic datasets. Rows in the data source can be converted to geo-indexed data stored in the geographic datasets, and then integrated into custom map data tiles, in one or more vector map data layers, that may combine underlying world map views with the map geometry data. In an example, a vector map data layer can be created by syncing these map data tiles to a geographic database on a back-end system that incorporates the PostGIS geo-extension of a PostgreSQL database (PostGIS being a spatial database extender for a PostgreSQL object-relational database). This adds support for geographic objects allowing location queries to be run in SQL. These map data tiles are generated and then served to the mapping user application on front-end system, and the properties and values of these shapes can be displayed for user interaction and selection on a map. The displayed map geometry data and information (e.g., properties and values) can be depicted using color, dashing, opacity, and/or other graphical representations.

Selection and interaction with the shape data allows for a variety of both simple and complex geo-workflows in which the user interacts with the geo-object-relation data model to yield existing data, derive new data, and perform operational tasks. Each dataset synced to the back-end and served to the front-end can be configured as a "layer" (e.g., a "vector map data layer") and provided in map data tiles. Each map data tile includes map geometry data (e.g., points, lines, polygons; "features") representative of map-related features, and can include a certain amount of information related to the map geometry data. Each vector map data layer can include meta-data that determines characteristics of the displayed map geometry data. For example, the minimum/maximum zoom levels or viewport at which the map geometry data will be displayed, coloration that will be used for values and properties of displayed features or data, opacity of the displayed shapes or data, line characteristics (e.g., width, dashing, and other graphical attributes) and graphical annotations of displayed features and information Vector map data layers can be created from datasets that contain information of various formats (e.g., Well Known Text or GeoJSON) and can be created, edited, and deleted via a Command Line Interface (CLI) or within the front-end. Upon selection of displayed features, users can select from a pre-configured set of functions that act on the feature type selected and return any number of outputs. In an example, selecting multiple country features might return the aggregate sum of the population of the two countries. In another example, selecting a building feature could return the number of insurance policies of clients within the building.

For data having a time-dimension ("temporal data"), a front-end and back-end cooperate to allow temporal control that display how shapes and their properties change over time. Such data may be depicted as one or more points, lines and/or polygons, and have different graphical representations (e.g., based on its meta-data). In an example, coloration of certain data can change over time to reflect changing population of a country. In another example, a building outline can be shown as changing over time due to extensions/modifications of its physical structure and this can be depicted on a map, and data corresponding to additional relevant policies and clients can also be displayed. Other examples include displaying weather, water/flooding, fires, vegetation, and infestations/disease information at certain dates and times. Temporal data can be included in map data tiles provided to the front-end (e.g., to a user application on the front-end). In an example, map data tiles initially provided to a front-end system may include temporal data. Or, map data tiles initially provided to a front-end system may not include temporal data, and when a user generates a query that requires temporal data (e.g., in a user application on the front-end), map data tiles previously generated are enriched to include the temporal data and the enriched vector map data tiles are served to the front-end and are accessed by the user application.

In one innovation, a computer system include one or more computer storage mediums configured to store computer-executable instructions, and one or more computer hardware processors, which are configured to execute the computer-executable instructions to cause the computer system to generate, from a first data source, a geographic dataset based on an ontology, the geographic dataset including first data objects representative of first data from the first data source, each first data object having at least one geo-spatial property based on respective location information from the first data source that corresponds to the first data; generate a first vector map data layer based on the ontology using the geographic dataset, the first vector map data layer including map data tiles having map geometry data associated with the first data objects, each map data tile corresponding to a portion of a geographic area represented by the first vector map data layer; generate a mapping between geo-spatial features in a user application on the front-end system and map geometry data in the first vector map data layer; and in response to a request from the front-end user system application for first data related to selected map geometry data which corresponds to one or more geo-spatial features displayed by the user application and selected by the user, generate and provide one or more enriched map data tiles of the first vector map data layer to the front-end system, the enriched map data tiles including map geometry data and information from first data objects that are associated with the selected map geometry data by the ontology.

Such systems can include one or more other features. In some embodiments, the one or more computer hardware processors are further configured to execute the computer-executable instructions to display map geometry data mapped to a selected geo-spatial feature on the user application on the front-end system. In some embodiments, the first data is representative of a characteristic of people, business, or nature. In some embodiments, the first data source is not structured based on the ontology. In some embodiments, the system is operable to create a geographic data set based on an input received from the front-end user system. In some embodiments, the system further comprises the front-end user system, wherein the system is operable to create, edit and delete a geographic data set via information received through a Command Line Interface (CLI) on the front-end system. In some embodiments, the geographic dataset includes data of two or more different formats including at least one of Well-Known Text or GeoJSON. In some embodiments, the first vector map data layer includes map geometry data linked to first data objects having temporal data depicting a property related to the respective map geometry at multiple instances in time. Each of the multiple instances in time may be representative of a certain minute, hour, day, week, month, or year. In some embodiments, the first data includes at least one of population, policies, clients, weather, water level, ice levels, fire activity, vegetation, infestations, or disease. In some embodiments, the system comprises the front-end system. In some embodiments, the front-end system includes a user interface that has a temporal data control feature to display information from the vector map data layer at various instances in time. In some embodiments, the geo-spatial reference relates to an area, region, town, city, county, state, country, continent, or hemisphere. In some embodiments, each vector map data layer includes meta-data that determines the minimum and maximum zoom display levels and properties on which map geometries and data will be displayed. In some embodiments, the meta-data determines coloration, opacity, of graphical depiction for displaying the map geometry data. In some embodiments, each of the one or more geo-spatial features displayed by the user application is an object which can be interacted with by the user.

In some embodiments, the one or more computer hardware processors are further configured to execute the computer-executable instructions to generate, from a second data source, a second geographic dataset based on the ontology, the second geographic dataset including second data objects representative of second data from the second data source, each second data object having at least one geo-spatial property based on respective location from the second data source that corresponds to the second data; generate a second vector map data layer based on the ontology using the second geographic dataset, the second vector map data layer including second map data tiles having map geometry data associated with the second data objects, each second map data tile corresponding to a portion of a geographic area represented by the second vector map data layer; generate a mapping between geo-spatial features in the user application and corresponding map geometry data in the second vector map data layer; and in response to a request from the front-end user system application for second data related to selected map geometry data in the second vector map data layer, generate and provide one or more enriched map data tiles of the second vector map data layer to the front-end system, the enriched map data tiles of the second vector map data layer including map geometry data and information from second data objects that are associated with the selected map geometry data by the ontology.

Another innovation includes a method, including generating from a first data source a geographic dataset based on an ontology, the geographic dataset including first data objects representative of first data from the first data source, each first data object having a geo-spatial property based on respective location information from the first data source that corresponds to the first data; generating a first vector map data layer based on the ontology using the geographic dataset, the first vector map data tile data layer including map data tiles having map geometry data associated with the first data objects, each map data tile corresponding to a portion of a geographic area represented by the first vector map data layer; generating a mapping between geo-spatial features in a front-end system application and map geometry data in the first vector map data layer; and in response to a request from the front-end system application for first data related to selected map geometry data which corresponds to one or more geo-spatial features displayed by the user application and selected by the user, generating and providing one or more enriched map data tiles of the first vector map data layer to the front-end user display system, the enriched map data tiles including map geometry data and information from first data objects that are associated with the selected map geometry data. The method can be performed by one or more computer hardware processors configured to execute computer-executable instructions on one or more non-transitory computer storage mediums.

In some embodiments of such methods, the one or more computer hardware processors are further configured to execute the computer-executable instructions to generate, from a second data source, a second geographic dataset based on the ontology, the second geographic dataset including second data objects representative of second data from the second data source, each second data object having at least one geo-spatial property based on respective location from the second data source that corresponds to the second data; generate a second vector map data layer based on the ontology using the second geographic dataset, the second vector map data layer including second map data tiles having map geometry data associated with the second data objects, each second map data tile corresponding to a portion of a geographic area represented by the second vector map data layer; generate a mapping between geo-spatial features in the user application and corresponding map geometry data in the second vector map data layer; and in response to a request from the front-end user system application for second data related to selected map geometry data in the second vector map data layer, generate and provide one or more enriched map data tiles of the second vector map data layer to the front-end system, the enriched map data tiles of the second vector map data layer including map geometry data and information from second data objects that are associated with the selected map geometry data by the ontology. In some embodiments, the method further includes displaying map geometry data mapped to a selected geo-spatial feature on the front-end system application. In some embodiments, each vector map data layer includes metadata that determines the minimum and maximum zoom display levels and properties on which map geometries and data will be displayed, and wherein the meta-data determines coloration, opacity, of graphical depiction for displaying the map geometry data.

The system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Further, the interactive and dynamic user interfaces described herein are enabled by innovations in efficient interactions between the user interfaces and underlying systems and components. For example, disclosed herein are improved methods of receiving user inputs, translation and delivery of those inputs to servers and various system components, automatic and dynamic execution of complex processes in response to the input delivery (e.g., generating vector map tiles, generating and storing a vector map data tile layer), automatic interaction among various components and processes of the system (e.g., front-end system to a server, server to a computer storage medium) and automatic and dynamic updating of the user interfaces (e.g., to display map geometry data, geo-spatial features, first data, and the like). The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data applications analyzing geo-spatial feature related data are limited in various ways (e.g., tedious preparation of data, limited data sources in easily accessible structures, voluminous data in tabular format that is not referenced to geo-spatial features used by an analyst) and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing, structuring, and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems, computer systems, and computer products are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

BRIEF DESCRIPTION OF THE DRAWINGS

FIG. 8 illustrates an example a flowchart illustrating the process for providing geo-spatial related information.

DETAILED DESCRIPTION

Overview

Figure 1A:
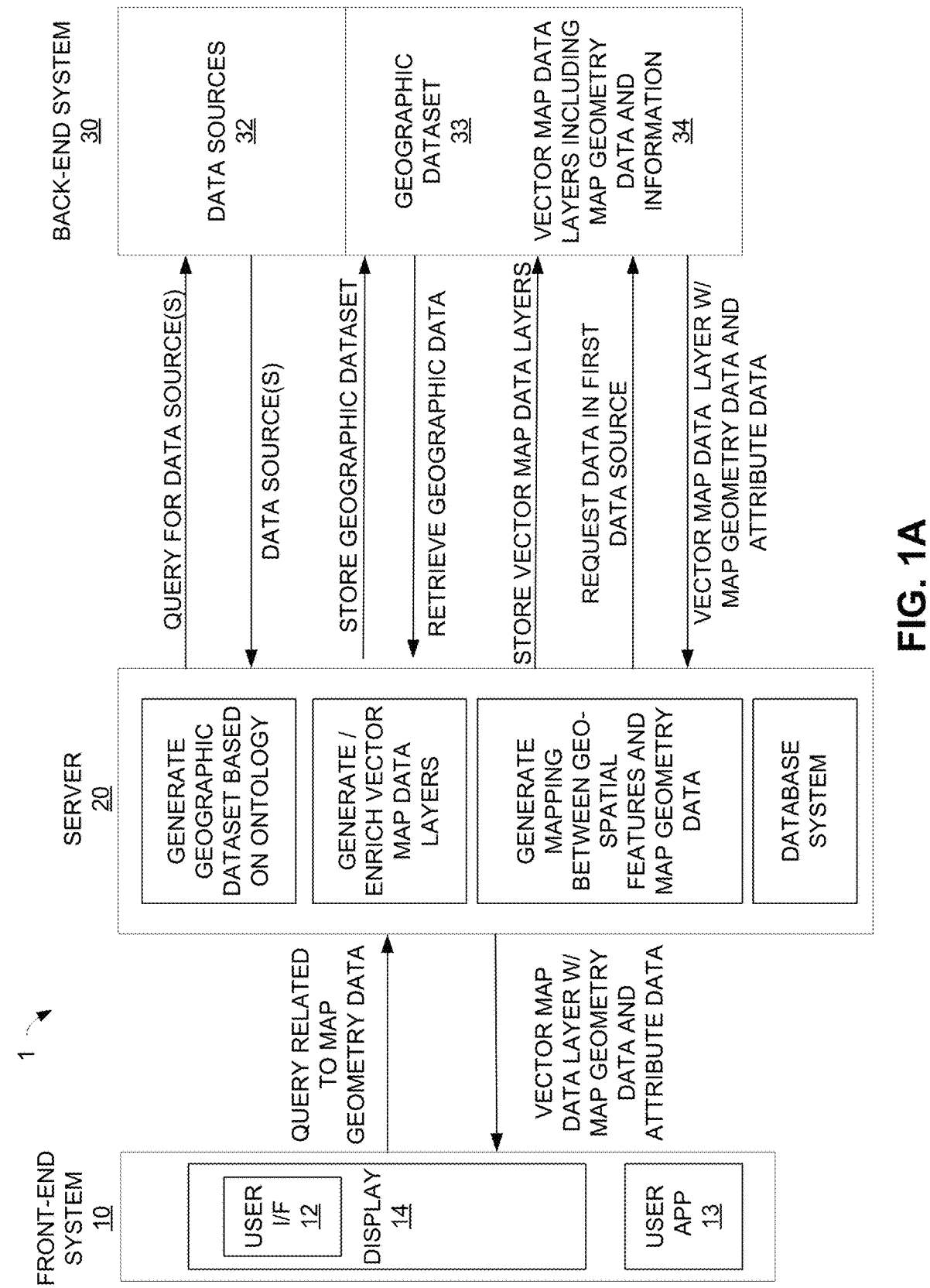
FIG. 1A is a block diagram of a data analysis system for exploring a geographic dataset which is structured based on an ontology.

Described herein are examples of systems, software applications and user interfaces for defining custom vector layers to take a large amount of geometric-shaped GIS data and place it on a map at scale. A software application front-end system (front-end) has the ability to treat geo-spatial features, which may be one or more single objects displayed on the map, as logical entities that can be interacted with through the rest of the system, and can display information on the map with a temporal aspect (e.g., time-series information) to explore states of map/objects on the map at various points in time.

Selection and interaction with the shape data allows for a variety of workflows in which the user interacts with a geo-object-relation data model to yield existing data, derive new data, and perform operational tasks. Data served to a user application on a front-end system can be configured as a vector map data layer having map data tiles. Each map data tile includes map geometry data, and can include information related to the map geometry data. Each vector map data layer can include meta-data that determines characteristics of the displayed map geometry data and/or information related to the map geometry data. For example, the minimum and maximum zoom levels for displaying map geometry data, coloration for values and properties of displayed data columns, features or data, opacity of displayed shapes or data, line characteristics (e.g., width, dashing, and other graphical attributes) and graphical annotations of displayed features and information.

Each dataset synced to the back-end and served to the front-end can be configured as a 'Layer' and is representative of a geographic area. The Layer can be created from datasets that contain geometry data of various formats, and served to a user application on a front-end system through map data tiles. A user can select geometries/shapes (map geometry data) from a Layer displayed on the user application and can select from a pre-configured set of functions that act on the object type selected, and the system returns any number of outputs. In an example, selecting displayed map geometry data representative of multiple countries might return the aggregate sum of the two counties populations. In another example, selecting a map geometry data of a building outline (footprint shape) could return the number of relevant policies and clients within this building.

For data having a time-dimension, a front-end and back-end cooperate to allow temporal control that display how shapes and their properties change over time. For example, a user interface can include a time control, for example, a "time slider," that displays data having a time dimension at various points in time (e.g., minutes, hours, days, weeks, months, years, etc.) based on the positioning of the slider. In an example, coloration of certain displayed data can change over time to reflect changing population of a country. In another example, a building outline can be shown as changing over time due to extensions/modifications of its physical structure and this can be depicted on a map, and data corresponding to additional relevant policies and clients can also be displayed. Other examples include displaying weather, water/flooding, fires, vegetation, and infestations/disease information at certain dates and times. The system can save a state of the displayed map such that the displayed layers, colors, graphics, annotations and the like is saved for others to open the same view on another system and/or at another time.

Workflows of a system can include using a mapping user application on a front-end system to control generating vector map data layers for use with the user application, allowing a large amount of geo-shape geographic information system (GIS) data to be placed on a map at scale without the need to be a GIS expert. For example, the system can allow the user to define a vector map data layer by selecting a type of data (e.g., geo-spatial features) via a user interface on a front-end system, and then selecting a first data source that includes information that a user desires to analyze. The information in the first data source is associated with a geo-spatial reference, for example, point, line, or area location information (e.g., GPS data, a latitude and longitude, an area name, a bounding rectangle or other shape data). A geographic dataset based on an ontology is generated from the first data source. One or more vector map data layers are also generated. Each vector map data layer includes map data tiles related to a portion of a geographic area associated with the vector map data layer. The map data tiles include the map geometry data and some associated information from the geographic dataset.

After map data tiles are initially generated, the map data tiles can be "enriched." For example, the new map data tiles generated or existing map data tiles are updated to include additional or other information, both referred to herein as "enriched" unless otherwise indicated). In an example, the map data tiles are enriched with information in the geographic database that was used to generate the initial map data tiles. For example, the map data tiles can be enriched on-the-fly by a server that has access to the geographic database that was initially used to generate in the map tiles, and provides the map data tiles to a front-end system for use by a map user application. In another example, the map data tiles are enriched with information in a geographic database different from the geographic databased used to generate the initial map data tiles. In another example, the map data tiles are enriched using information from external data source. Such a data analysis system provides the ability to treat features displayed on the user application as ontological objects that can interact with data from various data sources. Using ontological and vector map data tile layer functionality, the end-user can think across geo-spatial concepts of what boundaries or shapes they are trying to explore and do not have to know the underlying data tables and the data-structure concepts to effectively perform analysis.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for data object types and respective associated property types. An ontology may also include respective link types/definitions associated with data object types, which may include indications of how data object types may be related to one another. An ontology may also include respective actions associated with data object types. The actions associated with data object types may include, e.g., defined changes to values of properties based on various inputs. An ontology may also include respective functions, or indications of associated functions, associated with data object types, which functions, e.g., may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

Data Store: Any computer readable storage medium and/or device (or collection of data storage mediums and/or devices). Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent, or represent a portion of, a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Batch: As used herein is a broad term that refers to something that changes over time. A batch generally is associated with a start time and an end time, and may be monitored over a time period to collect data, the data being associated with a time during the batch (e.g., collected at an instance of time, or collected during a period of time during the batch). Time series data is an example of data that may be associated with a batch. A batch may be represented as a data object, or as a collection of data objects, where characteristics of the batch, (e.g., identification, start time, end time, time series data collected by various data sources, and the like) may be represented as a data object.

Event: An occurrence that takes place over a time period, where time series data can be collected during the occurrence. An event may have a start time and/or an end time, or at least an indicated (or identified) start time and/or end time. An event generally occurs at a location. For some events, the location may cover a large geographic area. For example, an earthquake, change in the size of ice fields or vegetation, ocean tides, flooding, snowfall, fires, disease, seismic activity, and volcanic eruptions are examples of events that may occur across a large geographic area, and including above and below the earth's surface. Events may also be referred to in the context of a batch if information is collected during an "event" over a period of time. For example, data collected over time (e.g., day, week, month, year, decade, and the like) relating to a "natural" event (e.g., fire, flood, weather, snow/ice, infestation, disease, and the like) may be referred to as a batch. In another example, a "business" event can include business data collected over a certain region or area (e.g., a city, state, country, and the like) may be referred to as a batch (see "Events" below). In an example, the business data can relate to sales, customers, repeat customer, contracts, deliveries, types of businesses, placement of product, and the like.

Time Series Data: A series of information referenced to time. For example, a series of information that is sensed, collected, determined, and/or stored over a period of time, such that the information may be referenced by the time that it was sensed, collected, determined, and/or stored. As used herein in reference to time series data, "information" is a broad term that may include sensor information and/or other types information that is collected either in reference to an instance of time or during a defined time period (e.g., milliseconds, seconds, minutes, hours, days, weeks, months, years, etc.). Time series data can include the number of times an event occurs during a time period. Some examples of time series data are provided here, but these examples are not meant to limit the type of information that can be included in time series data. In some examples, time series of information may be generated by a sensor, for example, a camera monitoring, the size of ice fields or vegetation, ocean tides, flooding, snowfall, fires, disease, seismic activity, volcanic eruptions, and the like. In some examples, the series of information is determined by from user input or data feeds from a data source, for example, a business data source. Time series data, or a time series data set, may also be referred to herein simply as "time series."

Data Source: A data source is a collection of information related to a geographic area. The data source can be in many different formats such as a tabular data format (SQL, delimited, or a spreadsheet data format), a data log format (such as network logs), or time series data (such as sensor data). A data source can include, for example, information related to a characteristic of people, business, nature, an event, an entity such as a person, a place, an organization, a market instrument, a contract, a transaction, and the like, and the information includes, or can be represented by, at least one geospatial reference indicative of a related location (e.g., a GPS coordinate, a latitude/longitude, a minimum bounding rectangle, a location name, or any other information representing a location). In an example, each row of a tabular formatted data source can include information relating to a particular person (or business or organization etc.) and can include a geospatial reference related to the particular person (or business or organization).

Geo-Spatial Feature: A geo-spatial feature is a feature represented on a user application and can include any natural, man-made, or designated areas and are associated with a geographic location. Geo-spatial features can relate to, or include, for example, a structure, an area, a coastline, a town, a city, a county, a state, a country, and the like. For example, the geo-spatial feature can be the name of a structure, an area, a coastline, a town, a city, a county, a state, a country, and the like. Geographic location may be a point, a line or boundary, or an area (e.g., defined by a geometric shaped closed boundary). In another example, a geo-spatial feature of a city may be associated with a geographic location that corresponds to a point representing the center of the city, a point that corresponds to any portion of the city (e.g., within the city's boundaries), or with geographic locations of a boundary of the city (e.g., the perimeter of the city limits).

Map Geometry Data: Points, lines, and polygons/geometric features included in map data tiles that represent natural and/or manmade features in a geographic area. Features can be, for example, a lot, a building, a city block, a town, a city, a district, a region, a county, a state, a country, a park, a forest, a body of water, a region, a zone, a habitat, geographic locations, geographical boundaries, geographic features, property boundaries, political-related boundaries, government-related boundaries, and the like. Map geometry data is associated with location information of the feature. Map geometry data is also associated with information (e.g., data objects) in a geographic dataset. For example, map geometry data can be associated with a data object by location information (e.g., a property of the data object) defined by an ontology.

Map Data Tiles: Data organized as a portion of a vector map data layer. Map data tiles can be structured as a database. Map data tiles include map geometry data and information associated with the map geometry data. For example, location information of the map geometry data, meta-data that is used to determine at what zoom level the map geometry data should be displayed and how (graphically) it should be displayed, and/or attributes, characteristics, time-series, or any other information related to the map geometry data.

Vector Map Data Layer: A vector map data layer includes a plurality of map data tiles and relates to a geographic area and in a format that can be used by a user application. Information in a vector map data layer typically comes from one data source. Multiple vector map data layers provided to a front-end system can each include information from a different data source. In some examples, a vector map data layer can include information from more than one data source (e.g., where each data source includes related data).

FIG. 1A is a block diagram of an illustrative example of a data analysis system 1 that includes a server 20 and a back-end system 30. Although certain features are described in reference to this example, implementations having other features, including additional features or less features, are also possible. The data analysis system 1 allows a user to view, select and retrieve information relating to geo-spatial features displayed in a user interface 12 on a display 14 of a user application 13 on a front-end system 10. In some embodiments the display 14 is a touchscreen display. The user application 13 can be a mapping application that displays geo-spatial features that are associated with a geographic area. In some embodiments, the data analysis system 1 includes the front-end system 10. In other embodiments, the data analysis system 1 communicates with a user application, or a front-end system, that is not part of the data analysis system. For example, the data analysis system 1 may communicate with multiple user applications and/or multiple front-end systems that are part of different systems.

The server 20 can query for information from a data source 32 and generate an geographic dataset 33, based on an ontology, from the data source 32. Rows in the data source can be converted to geo-indexed data and stored as data objects in the geographic dataset, such that the geographic dataset can be accessed using queries. The queries can be location-based queries. Information in the geographic dataset can be incorporated into map data tiles of a vector map data layer that includes map geometry data and information stored in the geographic dataset. The vector map layer can include information mapping of geo-spatial features available in the user application to the map geometry data. For example, such that selection of geo-spatial features in the user application correspondingly selects map geometry data in a data tile, and provides access to information in the geographic dataset related to the selected map geometry data.

In the example of FIG. 1A, the server 20 is in communication with the front-end system 10 and the back-end system 30. The server 20 can include functionality to generate a geographic data set 33, based on an ontology, from a data source 32. In some embodiments, the data source 32 is stored on another system (e.g., other than the back-end system 30) which is directly or indirectly accessible to the server 20. The geographic dataset 33 can be stored on the back-end system 30. In an example, rows in the data source 32 may be being converted to geo-indexed data and stored as data objects in the geographic dataset 33 which can be accessed using location queries (or other types of queries). Information in the geographic dataset 33 can be integrated into map data tiles of a vector map data layer 24. In some embodiments, map data tiles may combine underlying world map views (e.g., from a user application) with map geometry data. Examples of organizing and storing data in a geographic database based on an ontology are further described in reference to FIGS. 2, 3, 5, and 6. Generating a geographic dataset is further described in reference to FIG. 4A.

The back-end system 30 can include one or more computer storage mediums that are configured to store one or more data sources 32, one or more geographic datasets 33, and one or more vector map data tile layers 34. The server 20 also includes functionality to generate the vector map data layers. A vector map data layer can include map geometry data and information, related to the map geometry data, from the geographic dataset 33. The server 20 provides map data tiles of a vector map data layer to the front-end system 10 as needed by the user application 13, for example, that correspond with a geographic area being displayed on the user application 13.

A user application 13 can be a mapping application that includes geo-spatial features (e.g., parks, watersheds, forests, deserts, and other natural related boundaries, towns, cities, counties, states, countries, continents, hemispheres other social or politically defined areas, and the like) relating to a certain geographic area. The server 20 can generate mappings between geo-spatial features available in the user application 13 and map geometry data in the map data tiles, such that certain map geometry data is associated with each geo-spatial feature on the user application 13. This mapping provides a geo-spatial feature in the user application 13 to be associated with map geometry data and related information in the geographic dataset 33, and allows information relating to a geo-spatial feature selected in the user application 13 to be retrieved from the geographic dataset 33 and provided to the user application 13. In an example, a geo-spatial feature of a "Town" boundary (a polygon) in the user application may be mapped to map geometry data of "Structures" in a map data tile by associating all Structures, having a geographic location within the Town boundary, with the Town. Each Structure is associated with information in the geographic dataset 33. Thus by selecting the Town geo-spatial feature in the user application 13 and a query relating to Structures (e.g., owner of structures, use of structure, or another attribute), information related to the Structures can be retrieved from the geographic dataset 33 and provided via map data tiles to the user application 13. Each vector map tile layer provided to the user application 13 can include different types of information corresponding to the same geographic area, as they are generated from different data sources. In an example, one vector map tile layer can include "fire" information in a certain geographic area, and another vector map tile layer can include "insurance policy" related information over the same geographic area. Generating vector map data layers is described in further in reference to FIGS. 4A and 4B.

A vector map data layer can include certain information from the geographic dataset 33 that is associated with the map geometry data, which allows for quick access to such information by the user application 13 when the map geometry data is selected without having to generate a query to the back-end system 30. When additional information relating to map geometry data is needed by a user application 13 and it is not in map data tiles already provided to the front-end system 10, a query related to the map geometry data can be generated and sent to the server 20. The server 20 retrieves the queried-for information from the geographic dataset 33, generates enriched map data tiles that now include the queried-for information, and provides the enriched map data tiles to the user application 13. Generating enriched map data tiles is described in further detail in reference to FIGS. 4A and 4B. In some embodiments the server 20 includes a database system (or data management system) 20, for example, as illustrated and described further in reference to FIG. 1B.

Meta-data in a map data tile can include information that indicates how the map geometry data should be displayed. For example, meta-data can determine the minimum and maximum zoom display levels when map geometry data will be displayed, and other display properties including coloration, dashing, weight, opacity, and/or other graphical depictions. In an example, if a geographic area of a country is being displayed at a low zoom level ("zoomed out"), map geometry data representing towns and cities can be displayed, while map geometry data representing individual structures is not displayed. When geographic area of a certain town is displayed at a higher level ("zoomed-in") individual structures within the town may be displayed. When a user selects and interacts with certain map geometry data on the user application 13, properties of the selected map geometry data are queried for (either from the map data tile or from the geographic data set 33) and returned to be displayed for user consumption and understanding. Upon user selection of geo-spatial features or map geometry data displayed in the user application 13, users can select from a pre-configured set of functions that act on the object type selected and return any number of outputs derived from information in a geographic dataset. In an example, selecting multiple countries might return the aggregate sum of the two counties populations. In another more complex example, selecting a building outline/footprint shape, could return the number of policies and clients a partner might have within this building's shape location. In some embodiments, complex geo-spatial queries can be generated that are sent to the back-end system 30 to allow for near-arbitrary custom geo-query execution.

Data stored in a geographic dataset 33 can have a time-dimension. For example, relating to fires, water levels/flooding, weather, vegetation, business transactions, infrastructure, events, or any other information that changes over time. The front-end system 10 and back-end system 30 can cooperate to provide temporal data that is associated with a user selected geo-spatial feature and map geometry data. In some embodiments, the user interface can include a temporality slider that can be positioned to display how map geometry data and their properties change over time. For example, to show how the population of a country changes over time, or to show the extent of buildings in an area over time. Drawing tool functionality allows a user to generate and create custom geo-spatial features, which are saved for future visualization, manipulation, and use in geo-spatial data pipelines, data enrichment, data science, modelling, etc. Custom geo-spatial features can be saved and displayed in the front-end, or incorporated into a vector map data layer. In some implementations, users are able to save and share what's being displayed on the user application 13 by selecting a button on the user interface 12 that serializes the configuration and view displayed into a parametrized URL. This URL can be provided to other users and in the case they hold the same permissions and access controls to the underlying PostgreSQL synced data, those users will be able to view the vector map data layer provided by the 'saved state.'

Figure 1B:
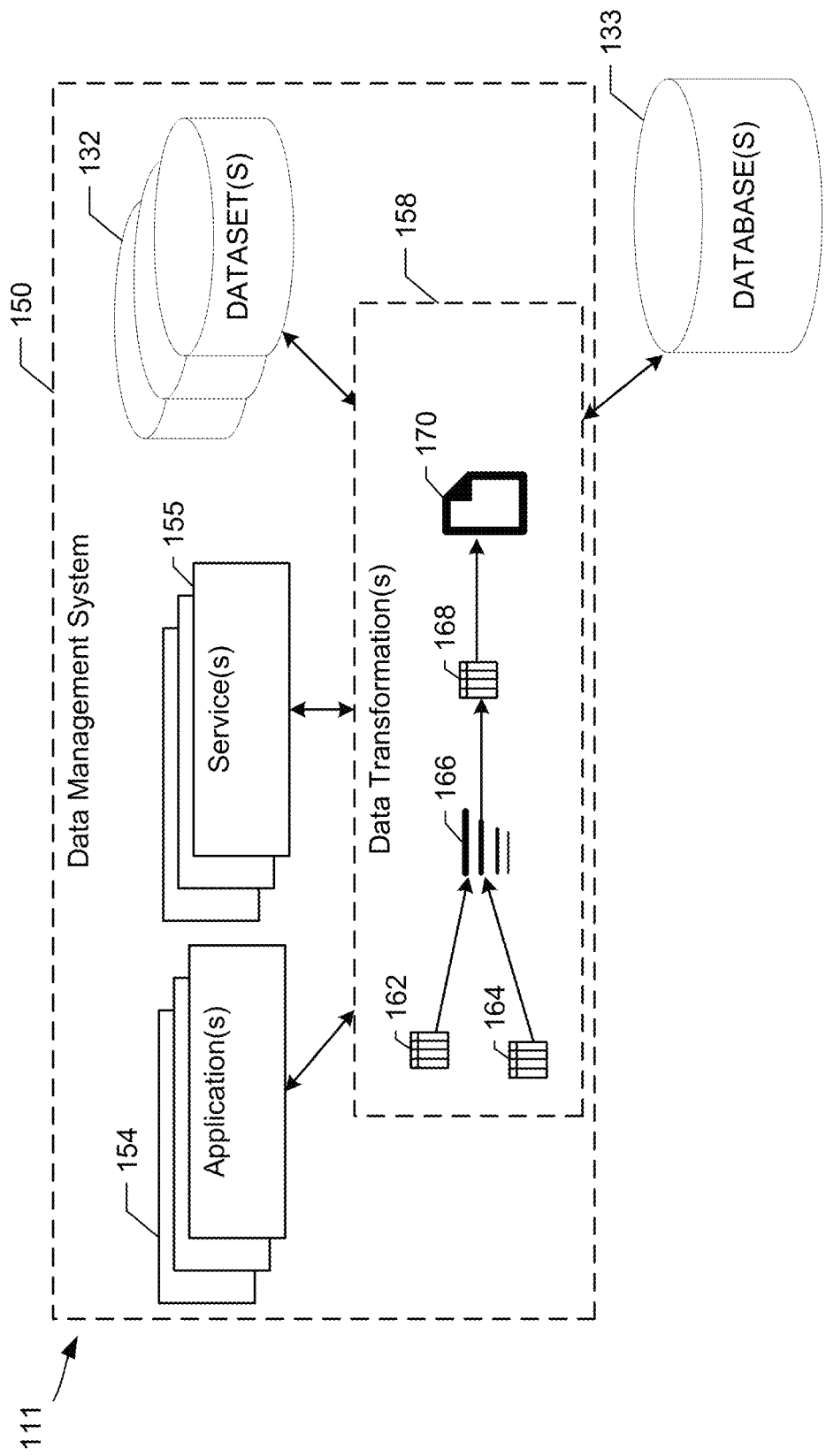
FIG. 1B is a block diagram illustrating a data management system for use with a data analysis system, according to some embodiments of the present disclosure.

FIG. 1B is a block diagram illustrating a data management system 150 for use with the data analysis system of FIG. 1A, according to some embodiments. In the embodiments of FIG. 1B, a computing environment 111 can be similar to, overlap with, and/or be used in conjunction with the data analysis system 1 of FIG. 1A. In an example, the computing environment 111 can include a database 133, which may be similar to the geographic dataset 33 in the computing environment 111 of FIG. 1A. In an example, the dataset(s) 132 can be similar to the data source 32 in FIG. 1A. However, the computing environment 111 can also include a data management system 150.

The example data management system 150 includes one or more applications 154, one or more services 155, one or more initial datasets 132, and a data transformation process 158 (also referred to herein as a build process). The example data management system 150 can include a data pipeline system. The data management system 150 can transform data and record the data transformations. The one or more applications 154 can include applications that enable users to view datasets, interact with datasets, filter data sets, and/or configure dataset transformation processes or builds. The one or more services 155 can include services that can trigger the data transformation builds and API services for receiving and transmitting data. The one or more initial datasets 132 can be automatically retrieved from external sources and/or can be manually imported by a user. The one or more initial datasets 132 can be in many different formats such as a tabular data format (SQL, delimited, or a spreadsheet data format), a data log format (such as network logs), or time series data (such as sensor data).

The data management system 150, via the one or more services 155, can apply the data transformation process 158. An example data transformation process 158 is shown. As an example and in reference to FIG. 1A, a data transformation can transform an initial dataset (e.g., 162) to a geographic dataset (e.g., output dataset 170). The data management system 150 can receive one or more initial datasets 162, 164. The data management system 150 can apply a transformation to the dataset(s). For example, the data management system 150 can apply a first transformation 166 to the initial datasets 162, 164, which can include joining the initial datasets 162, 164 (such as or similar to a SQL JOIN), and/or a filtering of the initial datasets 162, 164. The output of the first transformation 166 can include a modified dataset 168. A second transformation of the modified dataset 168 can result in an output dataset 170, such as a report or a joined table in a tabular data format that can be stored in the database 133. Each of the steps in the example data transformation process 158 can be recorded by the data management system 150 and made available as a resource to the front-end system 10. For example, a resource can include a dataset and/or a dataset item, a transformation, or any other step in a data transformation process. As mentioned above, the data transformation process or build 158 can be triggered by the data management system 150, where example triggers can include nightly build processes, detected events, or manual triggers by a user. Additional aspects of data transformations and the data management system 150 are described in further detail below.

The techniques for recording and transforming data in the data management system 150 may include maintaining an immutable history of data recording and transformation actions such as uploading a new dataset version to the data management system 150 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions. The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item). The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data management system 150 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data management system 150 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data management system 150 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data management system 150 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Object-Centric Data Model

Figure 2:
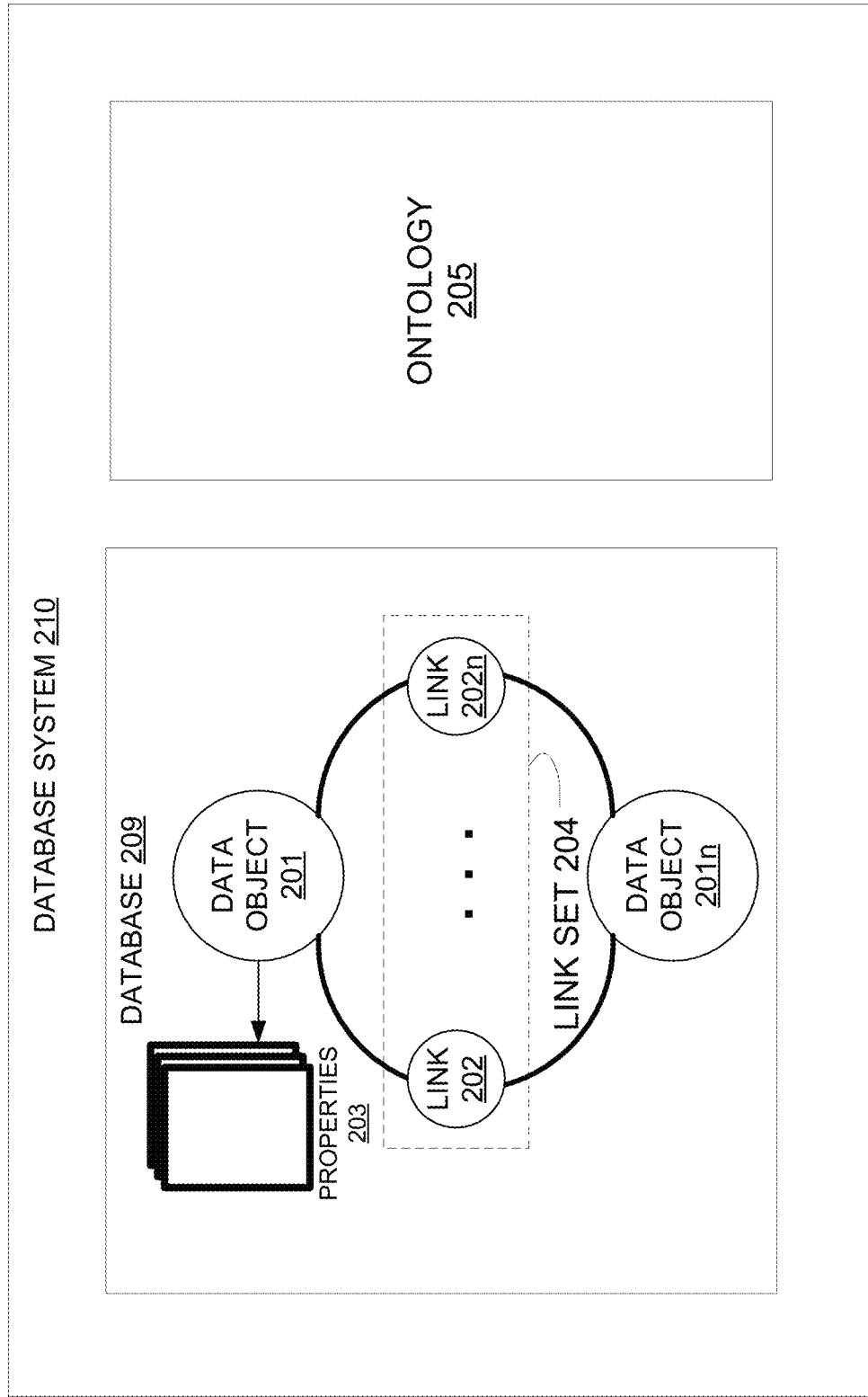
FIG. 2 illustrates one embodiment of a database system using an ontology.

FIG. 2 illustrates an object-centric conceptual data model according to an embodiment. To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information. In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, a contract, a transaction, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, data objects may also include a "Location" property type that indicates a geo-spatial location associated with the data object. A geo-spatial "Boundary" data object might have a geospatial "Location" property associated with a point within a boundary, or one or more points on a boundary. Each property 203 as represented by data in the database system 210 may have a property type defined by the ontology 205 used by the database 205. Objects may be instantiated in the database 209 in accordance with the corresponding object definition for the particular object in the ontology 205. The data objects defined in the ontology 205 may support property multiplicity. In particular, a data object 201 may be allowed to have more than one property 203 of the same property type.

Each link 202 represents a connection between two data objects 201. In one embodiment, the connection is either through a relationship, an event, or through matching properties. A relationship connection may be asymmetrical or symmetrical. The type of relationship between two data objects may vary depending on the types of the data objects. In one embodiment, when two data objects are connected by an event, they are also connected by relationships, in which each data object has a specific relationship to the event, such as, for example, an "Appears In" relationship.

As an example of a matching properties connection, two "Contract" data objects representing an insurance policy and a lease may both have an "Location" property that indicates the location of the insured property, or the leased property. If the insurance policy and the lease relate to the same property, then their "Location" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. A link between these two objects may represent a connection between these two entities through their co-occurrence within the same document. Each data object 201 can have multiple links with another data object 201 to form a link set 204.

Figure 3:
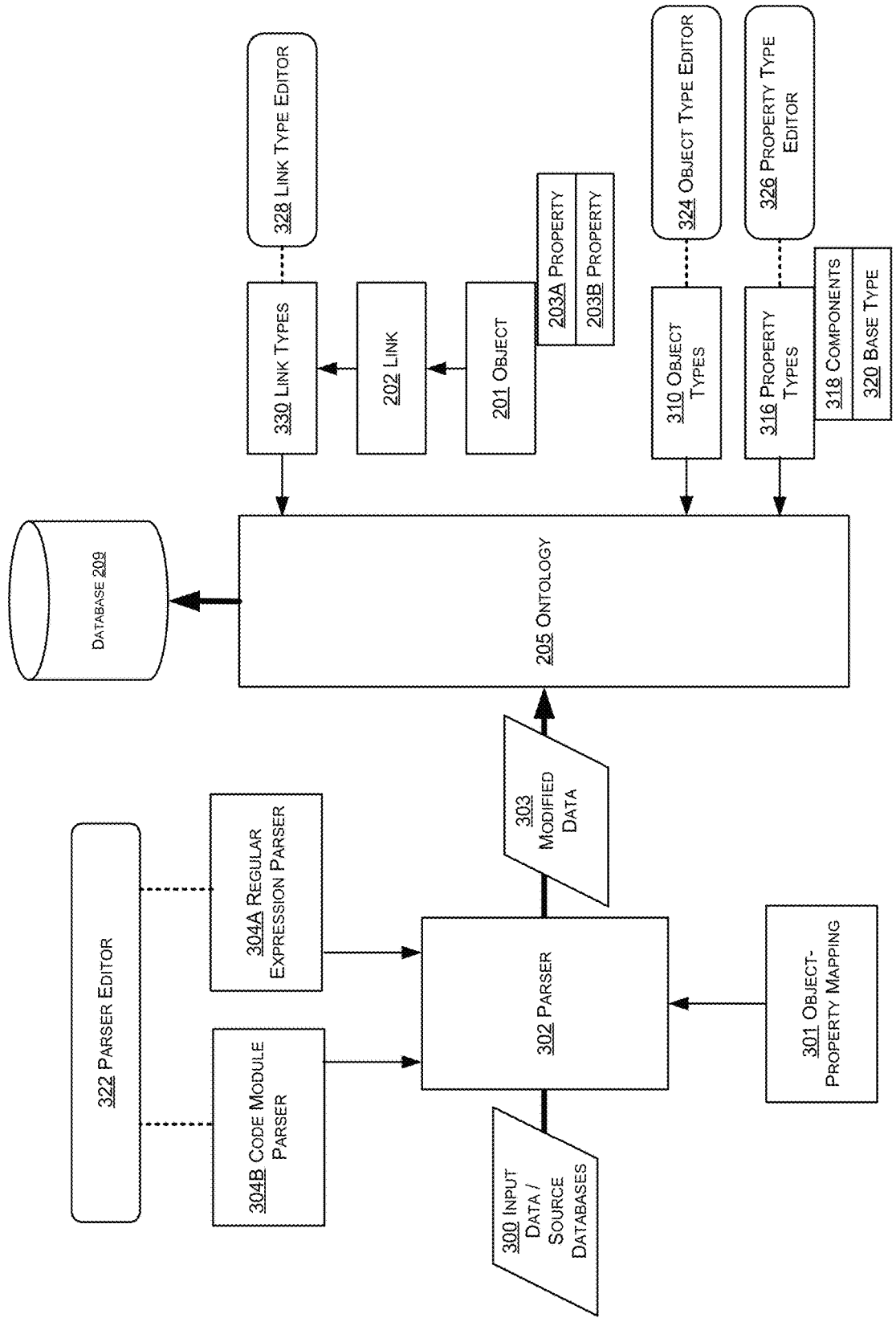
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Figure 4A:
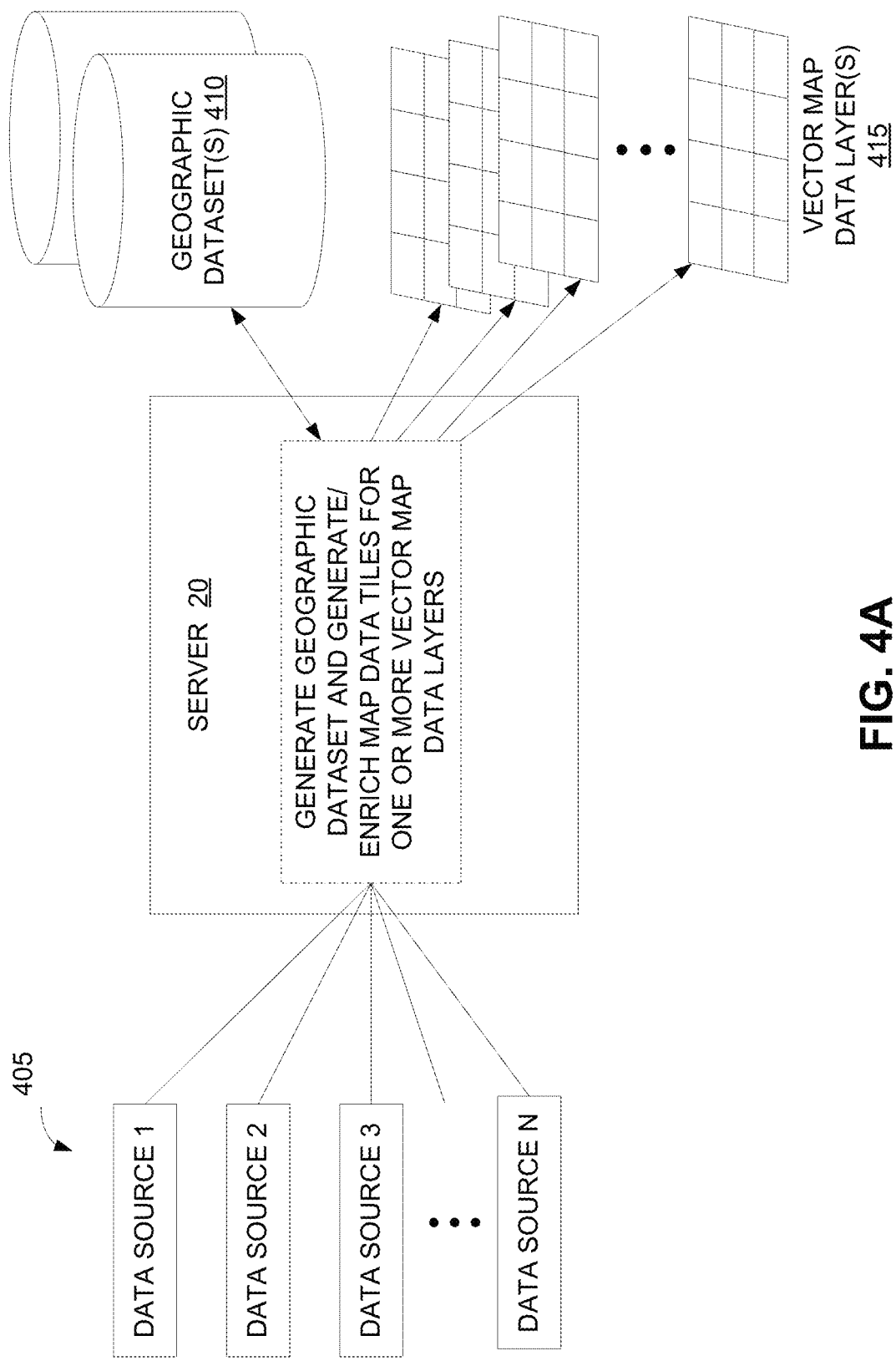
FIG. 4A is a diagram illustrating generating a geographic dataset organized by an ontology from one or more data sources, and generating/enriching one or more vector map data layers based on data in the geographic dataset.

FIG. 4A is a diagram illustrating generating one or more geographic datasets 410 from one or more data sources 405, and then generating/enriching map data tiles from the geographic datasets 410. Based on a desire to perform a certain analysis, one or more data sources 405 can be selected by a user, for example, via a user application 13 on a front-end system 10. For each selected data source 405, the server 20 generates a geographic dataset 410 that includes information from the data source 405 organized by an ontology. The server 20 can also generate a vector map data layer 415 having a plurality of data map tiles containing map geometry data (e.g., points, lines, polygons, etc.) that graphically represents certain information in the geographic dataset 410. The data map tiles may also include certain information (e.g., data, properties, characteristics, attributes, time-series, etc.) from the geographic dataset 410 related to the map geometry data. In some embodiments, a vector map data layer is generated from one data source. In some embodiments, a vector map data layer can be generated from two or more data sources.

Map geometry data can represent natural or man-made features, or other defined areas, and is associated with geographic location information such that they can be displayed on a geographic referenced user interface of a user application. The map geometry data is linked, or associated with, information in the geographic dataset 410. For example, map geometry data representing a "building" may be linked to information in the geographic database relating to companies, contracts, and/or people that reside in, of have a business connection to the building. In another example, map geometry data representing a "town" may be linked to information in the geographic database relating to people living in the town (population, demographics, etc.), business associated with the town (business locations, characteristics of the business), and/or events relating to the town (time series data relating to weather, fire, floods, construction, farming, and the like).

Map data tiles can include information from the geographic dataset 410, but typically not all of the information in the geographic dataset 410. In response to a request (e.g., a query from a user application) for information that is not in a vector map data layer previously provided, the server 20 can retrieve the requested information from the corresponding geographic data set 410, enrich map data tiles for a particular vector map data layer 415 or generate new enriched map data tiles, and provide the enriched map data tiles to the requestor. The server 20 can perform this enrichment process iteratively. That is, in response to a subsequent query for information that is not in enriched vector map data tiles previously provided, the server 20 can retrieve the queried-for information from the geographic dataset 410, further enrich the map data tiles (or generate new enriched map data tiles) for a particular map data layer, and provide these enriched map data tiles to the front end system 10.

Figure 4B:
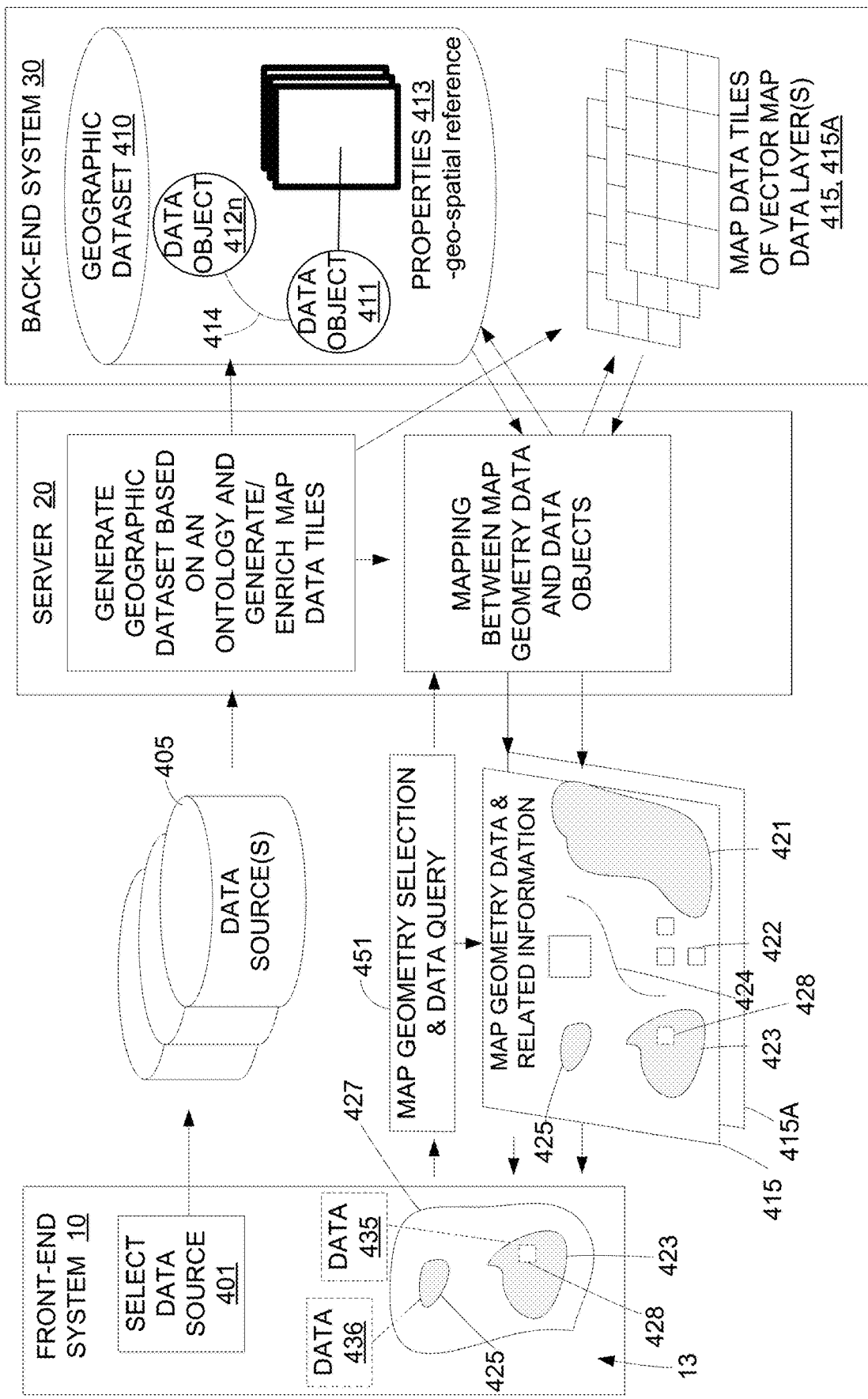
FIG. 4B illustrates an example of a data analysis system such as illustrated in FIG. 1 where map geometry data and information from a geographic dataset, related to the geometry data, are provided in a vector map data layer to the front-end system. Map data tiles in the vector map data layer initially provided to the front-end system can later be enriched to include additional information from the geographic dataset based on received queries for the additional information.

FIG. 4B illustrates an example of the data analysis system shown in FIG. 1A showing additional details and information communicated in the system. A user application 13 on the front-end system 10 can include functionality that allows a user to select one or more data sources 405 having information desired for a data analysis task. In some implementations, the user application include functionality to select a data source 401 from a list of available data sources displayed in the user application 13. The information in a data source 405 can be structured in various ways. For example, in a representative tabular format of row and columns, with a space or other field delimiter between information in each row indicative of a new column. Typically, the information in a data source 405 is not organized by an ontology. The server 20 generates, from the data source 405 a geographic dataset(s) 410 based on an ontology. For example, by parsing the data and generating data objects having links to other data objects as described in reference to FIGS. 2, 3, 5, and 6. The geographic dataset 410 includes data objects 411 having properties 413 that include information from the data source 405. Each data object 411 includes at least one property 413 indicative of a location relevant to the information (e.g., a geo-spatial reference), or the data object 412 is linked to another data object 411 that includes a property 413 indicative of such location information The location information can be, for example, a global positioning system (GPS) coordinate, a latitude/longitude, a name, or the like.

The server 20 also generates one or more vector map data layers 415, as described above in reference to FIG. 4A. When there are multiple vector map data layers, each vector map data layer can include map geometry data and information related to a certain type of data that is stored in a geographic dataset. For example, each of multiple vector map data layers can include information relating to a different data source, or different types of information relating to the same data source. In a non-limiting example, a first vector map data layer can include information relating to property insurance policies in a region; a second vector map data layer can include information relating to sales/transactions of a certain type of product in the region; third vector map data layer can include information relating to population demographics in the region; and fourth vector map data layer can include information relating to an event (e.g., a fire, flood, earthquake, storm) in the region. The information in a vector map data layer, and in the data map tiles, can be structured as a database, or in any other suitable data structure.

A vector map data layer 415 is representative of a geographic area. Each vector map data layer includes map data tiles having map geometry data, each map data tile corresponding to a portion of the geographic area. The server 20 generates map geometry data based on information in the geographic dataset 410. The server 20 also generates a mapping of geo-spatial features in a user application that will be used to display the map geometry data, with the map geometry data, such that map geometry data can be displayed in the user application when an associated geo-spatial feature is selected in the user application 13. For example, if a user selects a geo-spatial feature (e.g., a state) in the user application 13, map geometry data in map data tiles associated with the state (e.g., town boundaries, city boundaries, county boundaries, buildings, etc.) can be displayed in the user application 13.

The server 20 can also generates a mapping, or association, between map geometry data in map data tiles and information (e.g., one or more data objects) in the geographic dataset 410 that are related to the map geometry data. In an example, map geometry data of a 'building' can be mapped to data objects in the geographic dataset 410 relating to business transactions or contracts relevant to the building, for example, transactions or contracts of companies housed in the building, or of a company that owns the building. In another example, map geometry data of a 'town' can be mapped to information in the geographic database related to the town, for example, population demographics, business or economics, natural features (e.g., water features), or man-made (e.g., infrastructure) features. The information in the geographic dataset can include time-series data events allowing the information can be displayed temporally. In another example, geometry data of an 'county' can be mapped to time series data information in the geographic dataset relating to flooding, fires, disease/outbreaks, etc. In an example, mapping can be based on a location information (e.g., a property) property of the map geometry data and the data object. In another example, the mapping can be based on a common or related property of the map geometry data and a data object. The mappings and the ontology allow the data analysis system, and in particular the server 20, to provide, in response to a selection of a geo-spatial feature and/or a user query on a user application on the front-end system 10, geometry data and information from the geographic dataset that is related to the geo-spatial feature and the user query.

Still referring to FIG. 4B, the server 20 generates a geographic data set 410 and initial map data tiles for one or more vector map data layers 415. The server 20 can provide the one or more vector map layers 415 to the front-end system 10 for use by the user application 13. The user application 13 is configured to display map related information including geo-spatial features and map geometry data. The user application 13 can generate a query 451 for map geometry data relating to a geo-spatial feature and information related to the map geometry data. The initial map data tiles 415 provided to the front-end system 10 may include information requested in the query 451. If so, the information satisfying the query 451 can be provided to the user application 13 by the initial map data tiles 415. If the initial map data tiles 415 do not include at least some information requested in the query 451, the server 20 receives the query 451, retrieves information from the geographic dataset 410 requested in the query, generates enriched map data tiles 415A that includes information requested in the query 451, and provides the enriched map data tile 415A to the user application 13 on the front-end system 10. This process of receiving a query at the sever 20 from the front-end system 10, generating enriched map data tiles, and providing the enriched map data tiles to the front-end system 10 can be iteratively performed as a user performs a data analysis task using the user application 13.

In one example, the initial map data tiles 415 include map geometry data and little, if any, information from the geographic dataset 410 such that queries from a user application for information relating to selected map geometry data requires the server 20 to generate and provide enriched map data tiles. In another example, the initial map data tiles 415 include map geometry data and a first amount (e.g., a small amount) of information relating to the map geometry data, such that queries from a user application for information relating to selected map geometry data that is not included in the first amount requires the server 20 to generate and provide enriched map data tiles, and this process can be iteratively repeated. In another example, the initial map data tiles 415 may include map geometry data and a second amount (e.g., a larger amount than the first amount, or all) of the information relating to the map geometry data, such that most (or all) queries for information related to a specific analysis can be satisfied by the information in the initial map data tiles, which will minimize the need to make additional back-end queries and minimize the need to generate enriched map data tiles. In some embodiments, the amount of information provided in the map data tiles can be dynamically determined based on previously performed similar analytic tasks. For example, the information from the geographic dataset 410 needed for a certain task can be determined by the server, and when the same task or a similar task is performed the same amount of information is provided in the initial map data tiles. In another example, after enriched map data tiles are generated (e.g., iteratively generated as needed for an analysis) the enriched data tiles are saved so that they can be provided to another analyst for a similar analysis task.

Still referring to FIG. 4B, in one example, for a particular vector map data layer, the initial vector the map data tiles 415 includes map geometry data 421, 422, 423, 424, 425, but does not initially include map geometry data 428. The map data tiles 415 may also include some but not all information relating to the map geometry data 421, 422, 423, 424, 425 from the geographic dataset 410. A mapping user application 13 displays a geo-spatial feature (e.g., a town, county, state boundary) over the geographic area being analyzed, and can receive a selection of a geo-spatial feature 427 displayed on the user application 13 The geo-spatial feature 427 is one feature of multiple features provided in user application 13. The geospatial feature 427 encompasses (or surrounds) map geometry data 423 and 425, which is also displayed on the user application 13 and is part of the map geometry data provided in the initial map data tile. The user application 13 can also receive an input requesting information related to the map geometry data 423, 425 that is within geo-spatial feature 427. Accordingly, the user application 13 generates a query 451 requesting this information (e.g., information that was originally being in a selected data source 405 and now is in the geographic dataset 410). The query 451 can request, for example, a certain type of data that relates to the map geometry data 423, 427 (for example, population information, insurance information, etc.).

If the initial map data tiles 415 includes information to satisfy the query 451, the information is provided from the initial map data tiles 415. If the information is not in the initial map data tiles, the query 451 is communicated to, and received by, the server 20. Based on the mapping between the map geometry data 423, 425 and data objects in the geographic data set 410, the server 20 retrieves the requested information from the geographic data set 410. The server 20 then may either enrich existing map data tiles 415A, or generate new enriched map data tiles 415A, such that the enriched map data tiles include the requested information. The enriched map data tiles 415A can include the information in the initial map data tiles 415 and additional information. The enriched map data tiles 415A are then provided to the front-end system 10. In this example, the enriched map data tiles 415A include additional map geometry data, feature 428, that is within selected map geometry data 423. The enriched map data tiles 415A also include data 435 related to map geometry data 423 and data 436 related to map geometry data 425 which was included to satisfy the query 451. Feature 428 and data 423 and 436 can be displayed on the user application 13 The process of querying for more information and having enriched map data tiles be generated and provided by the server 20 can be iterative. Also, such a process can be performed for map data tiles in each vector map data layer provided to the user application. In other words, a query for map geometry data and/or information made by a user when viewing a particular vector map data layer can be made relative to just the vector map data layer being viewed, or one or more vector map data layers in a corresponding geographic area. This configuration allows a user to drill down into a geographic area and identify features (represented by map geometry data) that are of interest to the current analysis being performed, and then query and receive information from the geographic data set 410 that is related to the features of interest, where the provided information was originally included in a selected data source 405. A configuration where most, if not all, of the information from a data source is included in map data tiles for the vector map data layer can allow the user application to have quicker access to the information because it is stored locally (on the front-end system 10).

In some embodiments, when a vector map data layer is generated to include only a portion of the information from a data source 405, the information from the data source 405 that is included in the vector map data layer can be determined by user input when the user selects the data source 401. In other embodiments, the information from the data source 405 that is included in the vector map data layer can be determined based on the type of data analysis task/project being performed by the user. For example, if a user is trying to determine insurance policies that are affected by events in a certain area, information from a data source 405 that indicates the representation of a number of insurance policies across the geographic area may be included in the vector map data layer and displayed as needed on the user application. During the data analysis, the user may select a sub-set of the displayed information for detailed information of the policies in the subset that is not in the vector map data layer, and this information is provided from the geographic dataset 410. Having a portion of the information stored locally in the vector map data layer and additional more comprehensive information available from the geographic dataset 410 can facilitate efficiency in the analysis, allowing for quicker initial drill-down into information stored locally on the front end system and retrieval as-needed for comprehensive information from a geographic data set 410 on the back-end system 30.

Figure 5:
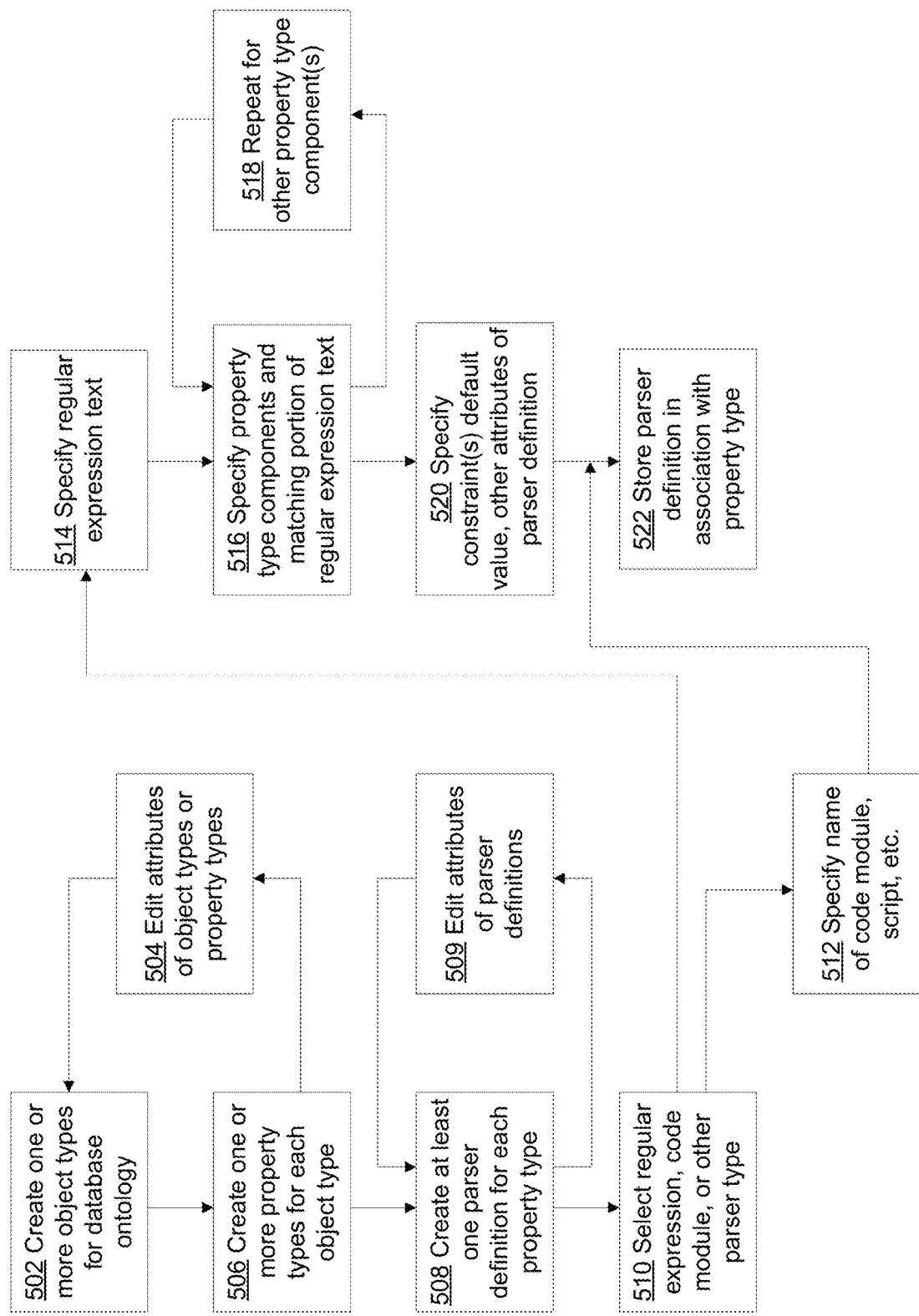
FIG. 5 illustrates defining a dynamic ontology for use in creating data in a data store.

FIG. 5 illustrates defining a dynamic ontology for use in creating data in a database. For example, for creating a geographic dataset based on a data source. For purposes of illustrating a clear example, steps 502-509 of FIG. 5 are first described at a high level, and details of an example implementation follow the high level description. In step 502, one or more object types are created for a database ontology. In step 506, one or more property types are created for each object type. As indicated in step 504, the attributes of object types or property types of the ontology may be edited or modified at any time. In step 508, at least one parser definition is created for each property type. At step 509, attributes of a parser definition may be edited or modified at any time. In an embodiment, each property type is declared to be representative of one or more object types. A property type is representative of an object type when the property type is intuitively associated with the object type. In an embodiment, each property type has one or more components and a base type. In an embodiment, a property type may comprise a string, a date, a number, or a composite type consisting of two or more string, date, or number elements. Thus, property types are extensible and can represent complex data structures. Further, a parser definition can reference a component of a complex property type as a unit or token.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

In an embodiment, an object type editor panel could comprise graphical buttons for selecting add, delete, and edit functions, and one or more rows that identify object types and a summary of selected attributes of the object types. In an embodiment, a user interacts with a computer to perform the following steps to define an object type.

In an embodiment, a user interacts with the computer to define a property type in a similar manner. The user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property. In various embodiments, validators may comprise regular expressions, a set of fixed values, or a code module.

In an embodiment, defining a property type includes identifying one or more associated words for the property type. The associated words support search functions in large database systems. For example, a property type of "Address" may have an associated word of "home" so that a search in the system for "home" properties will yield "Address" as one result. In an embodiment, defining a property type includes identifying a display formatter for the property type. A display formatter specifies how to print or display a property type value.

In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language. In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Accordingly, referring again to FIG. 5, creating a parser definition for a property type at step 508 may comprise selecting a parser type such as a regular expression, code module, or other parser type. When the parser type is "code module," then a user specifies the name of a particular code module, script, or other functional element that can perform parsing for the associated property type.

In an embodiment, defining a property type includes creating a definition of a parser for the property type using a parser editor. In an embodiment, a screen display comprises a Parser Type combo box that can receive a user selection of a parser type, such as "Regular Expression" or "Code Module." A screen display further comprises a Name text entry box that can receive a user-specified name for the parser definition. When the parser type is "regular expression," steps 514-520 are performed. At step 514, regular expression text is specified. For example, when the Parser Type value of combo box is "Regular Expression," a screen display comprises an Expression Pattern text box that can receive a user entry of regular expression pattern text. In step 516, a property type component and a matching sub-definition of regular expression text is specified. For example, a screen display further comprises one or more property type component mappings. Each property type component mapping associates a sub-definition of the regular expression pattern text with the property type component that is shown in a combo box. A user specifies a property type component by selecting a property type component using a combo box for an associated sub-definition. As shown in step 518, specifying a property type component and sub-definition of regular expression text may be repeated for all other property type components of a particular property type.

In step 520, a user may specify one or more constraints, default values, and/or other attributes of a parser definition. The user also may specify that a match to a particular property type component is not required by checking a "Not Required" check box. A screen display may further comprise a Default Value text box that can receive user input for a default value for the property type component. If a Default Value is specified, then the associated property type receives that value if no match occurs for associated grouping of the regular expression. In alternative embodiments, other constraints may be specified.

At step 522, the parser definition is stored in association with a property type. For example, selecting the SAVE button causes storing a parser definition based on the values entered in screen display. Parser definitions may be stored in database 209.

The approach of FIG. 5 may be implemented using other mechanisms for creating and specifying the values and elements identified in FIG. 5, and a particular GUI of is not required. Advantageously, use of a dynamic ontology may allow a user to take advantage of an ontological data model, while not constraining himself or herself to a hard-coded ontology. Hard-coded ontologies can be overly simple (i.e. lacking detailed semantic properties, making classification difficult but limiting analysis) or overly complex (i.e. having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

Advantageously, use of a parser or other ontology configuration tools may allow greater scalability of a user's database without loss of any analytic ability. Use of a parser or other ontology configuration tools and parser definitions, (e.g., first name, last name, etc.), may allow for self-categorization without the need for manual coding. Manual coding of a data object's properties may be subject to many of the disadvantages associated with manual data entry (e.g., slow, inaccurate, and costly). Additionally, manual coding of a data object's properties may not allow for dynamic ontology reconfiguration if a user chose to adjust the granularity, (i.e., specificity), or an ontology's semantic properties.

Various methods can be used for of transforming data and creating the data in a database using a dynamic ontology. In one example described here, input data an input data file is received. The input data file may comprise a comma-separated value (CSV) file, a spreadsheet, XML, or other input data file format. An object type associated with input data rows of the input data is identified, and one or more property types associated with input data fields of the input data are identified. The object-property mapping may be integrated into input data or may be stored as metadata in association with a data input tool. A row of data is read from the input data, and one or more field values are identified based on delimiters or other field identifiers in the input data. Then, a set of parser definitions associated with the property type of a particular input data field is selected. For example, metadata stored as part of creating a property type specifies a set of parser definitions, as previously described. The next parser definition is applied to an input data field value. Thus, data fields are read from each row of the file and matched to each parser that has been defined for the corresponding property types.

If applying a definition results in a match to the input data, a property instance is created, and the input data field value is stored in a property of the property type associated with the matching sub-definition of the parser definition. If no match occurs, then control transfers to test whether other parser definitions match the same input data value. As an example, a property editing wizard in which multiple parsers have been created for a particular property, and through a process loop each of the multiple parsers can be used in matching input data. If no match occurs to the given parser definition, then any other parser definitions for that property type are matched until either no match occurs, or no other parser definitions are available. If a grouping is empty, then the component is filled by the default value for that component, if it exists. If no other parser definitions are available, then an error can be raised or the property is discarded. The preceding steps are repeated for all other values and rows in the input data until the process has transformed all the input data into properties in memory. In a next step, an object of the correct object type is instantiated. For example, the object-property mapping may specify an object type for particular input data, and that type of object is instantiated. The newly created object is associated in memory with the properties that are already in memory. The resulting object is stored in the database.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

Figure 6:
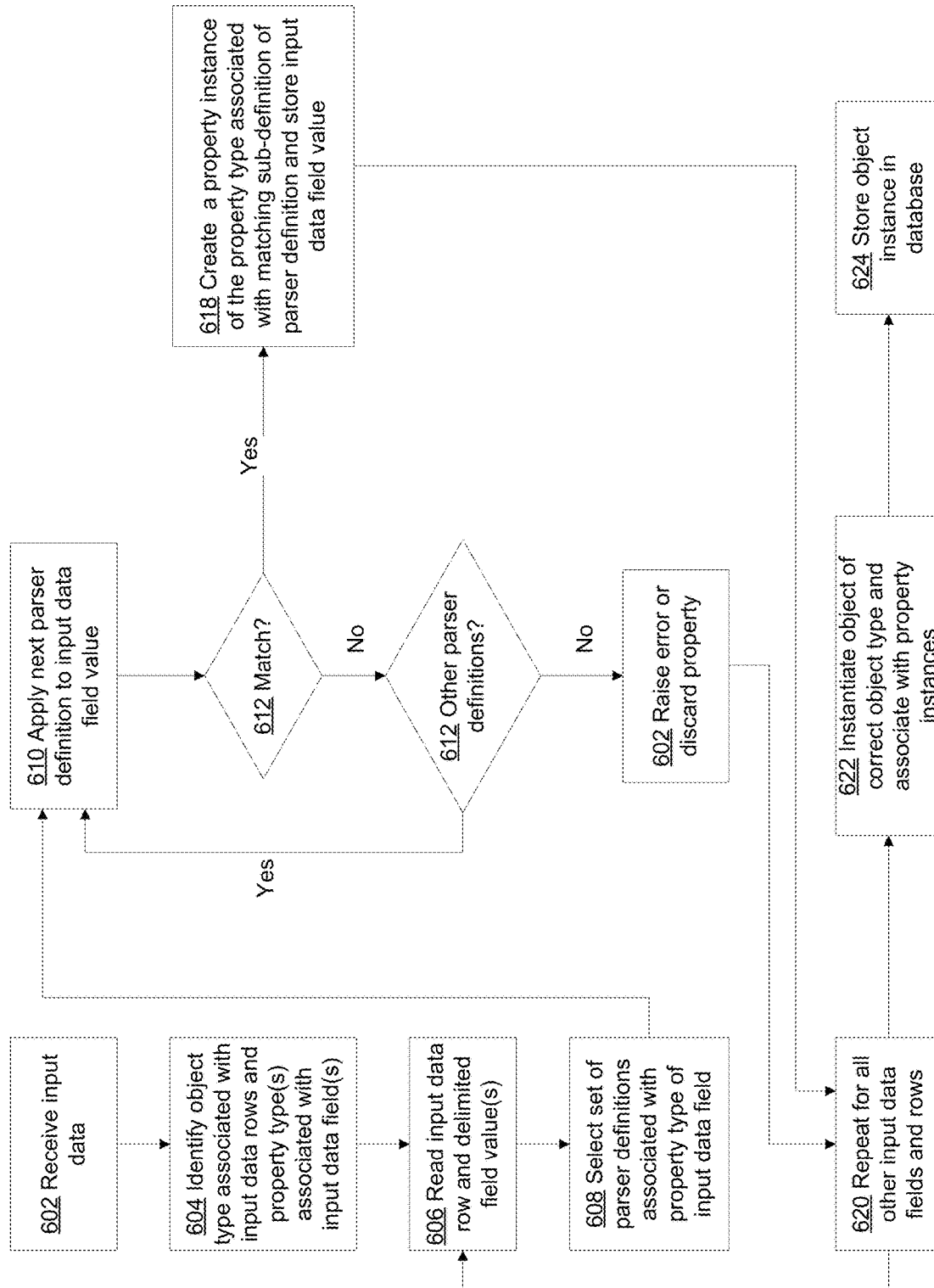
FIG. 6 illustrates a method of transforming data and creating the data in a data store using a dynamic ontology.

FIG. 6 illustrates a method of transforming data and creating the data in a data store using a dynamic ontology that can be used to organize data in a geographic database. For purposes of illustrating a clear example, the approach of FIG. 6 is described herein with reference to FIG. 3. However, the approach of FIG. 6 may be implemented using other mechanisms for performing the functional steps of FIG. 6, and the particular system of FIG. 3 is not required. In step 602, input data is received. In an embodiment, an input data file is received. The input data file may comprise a comma-separated value (CSV) file, a spreadsheet, XML or other input data file format. Input data 300 of FIG. 3 may represent such file formats or any other form of input data. In step 604, an object type associated with input data rows of the input data is identified, and one or more property types associated with input data fields of the input data are identified. The object-property mapping 301 may be integrated into input data 300 or may be stored as metadata in association with a data input tool.

In step 606, a row of data is read from the input data, and one or more field values are identified based on delimiters or other field identifiers in the input data. In step 608, a set of parser definitions associated with the property type of a particular input data field is selected. For example, metadata stored as part of creating a property type specifies a set of parser definitions, as previously described. In step 610, the next parser definition is applied to an input data field value. Thus, data fields are read from each row of the file and matched to each parser that has been defined for the corresponding property types. For example, assume that the mapping indicates that an input data CSV file comprises (Last Name, First Name) values for Name properties of Person objects. Data fields are read from the input data CSV file and compared to each of the parsers that has been defined for the Name property type given the First Name field and Last Name field. If a match occurs for a (Last Name, First Name) pair value to any of the parsers for the Name property type, then the parser transforms the input data pair of (Last Name, First Name) into modified input data to be stored in an instantiation of a Name property.

If applying a definition at step 610 results in a match to the input data, as tested at step 612, then at step 618 a property instance is created, and the input data field value is stored in a property of the property type associated with the matching sub-definition of the parser definition. If no match occurs at step 612, then control transfers to step 614 to test whether other parser definitions match the same input data value. As an example, a property editing wizard in which multiple parsers have been created for a particular property, and through the loop shown in FIG. 6, each of the multiple parsers can be used in matching input data. If no match occurs to the given parser definition, then any other parser definitions for that property type are matched until either no match occurs, or no other parser definitions are available. If a grouping is empty, then the component is filled by the default value for that component, if it exists. If no other parser definitions are available, then control transfers from step 614 to step 616, at which point an error is raised or the property is discarded. At step 620, the preceding steps are repeated for all other values and rows in the input data until the process has transformed all the input data into properties in memory. At step 622, an object of the correct object type is instantiated. For example, the object-property mapping 301 may specify an object type for particular input data, and that type of object is instantiated. The newly created object is associated in memory with the properties that are already in memory. The resulting object is stored in the database in step 324.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

Figure 7:
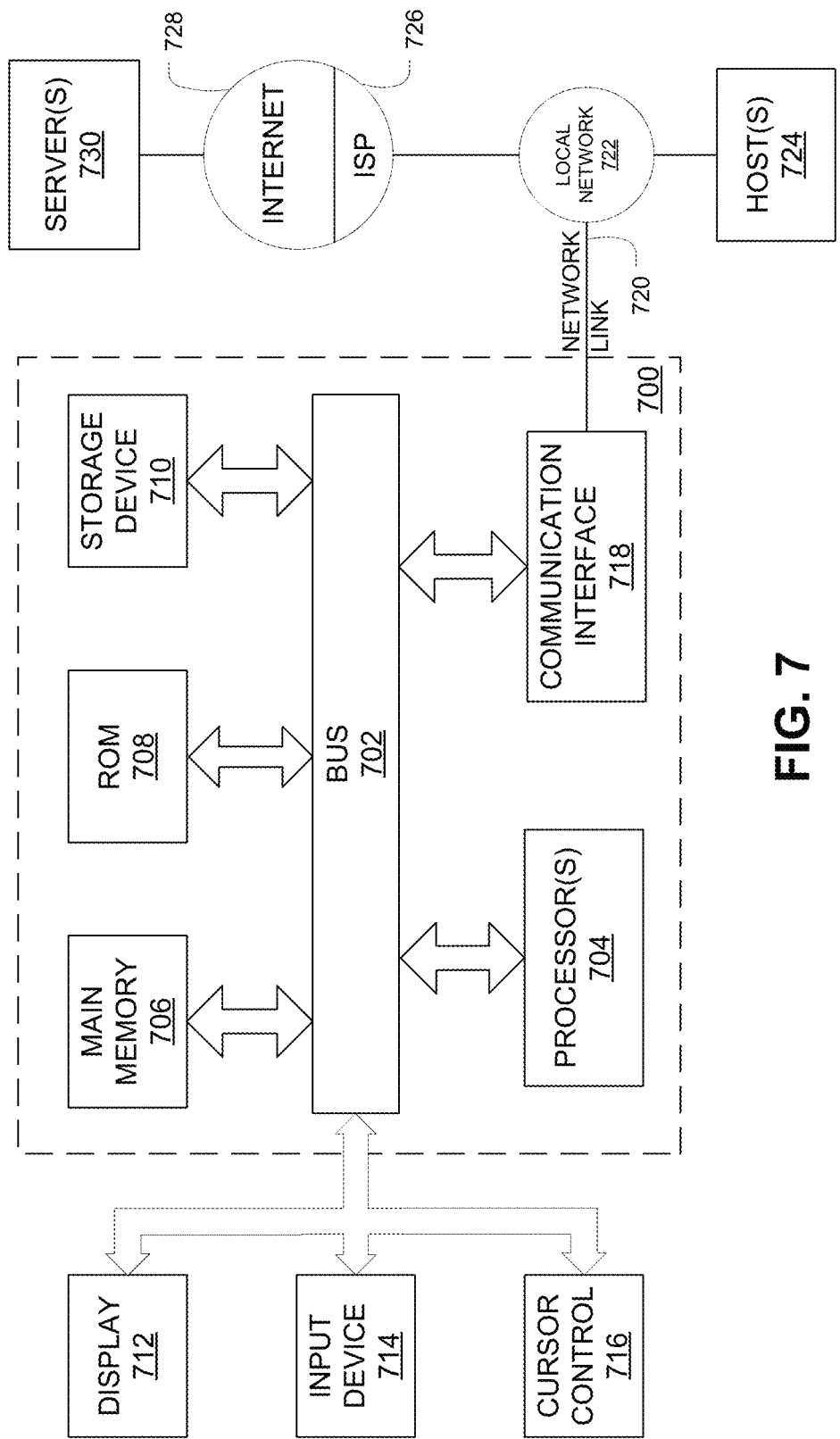
FIG. 7 illustrates a computer system with which certain methods discussed herein may be implemented.

FIG. 7 is a block diagram that illustrates a computer system 700 upon which various embodiments of a data analysis system may be implemented. For example, in server 20 of FIG. 4B.

Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors. Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media. Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In various embodiments certain functionality may be accessible by a user through a web-based viewer (such as a web browser), or other suitable software program). In such implementations, the user interface may be generated by a server computing system and transmitted to a web browser of the user (e.g., running on the user's computing system 700). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

FIG. 8 illustrates an example a flowchart illustrating the process 800 for providing geo-spatial related information, for example, to a user mapping application on a front-end system. At block 805, the process generates, from a first data source, a geographic dataset based on an ontology, the geographic dataset including first data objects representative of first data from the first data source, each first data object having a geo-spatial property based on respective location information from the first data source that corresponds to the first data. An example of generating a geographic data set from the data source is described in reference to FIGS. 4A and 4B. At block 810, the process continues and generates a first vector map data layer based on the ontology using the geographic dataset, the first vector map data tile data layer including map data tiles having map geometry data associated with the first data objects, each map data tile corresponding to a portion of a geographic area represented by the first vector map data layer. An example of generating the first vector map data layer described in reference to FIG. 4B.

At block 815 the process 800 continues and generates a mapping between geo-spatial features in a front-end system application and map geometry data in the first vector map data layer. In an example, this mapping may be done in part, for example, by correlating location information associated with the geospatial feature we location information associated with the map geometry data. At block 820 the process 800 continues and, in response to a request from the front-end system application for first data related to selected map geometry data, generates and provides one or more enriched map data tiles of the first vector map data layer to the front-end user display system, the enriched map data tiles including map geometry data and information from first data objects that are associated with the selected map geometry data. An example of providing the enriched map data tiles the described in reference to FIG. 4B. In various embodiments, process 800 can be performed by one or more computer hardware processors configured to execute computer-executable instructions on one or more non-transitory computer storage mediums.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums). The computer readable storage medium can be a tangible device that can retain and store data and/or instructions for use by an instruction execution device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors, (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques). Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Conventional operating systems control and schedule computer processes for execution, perform memory management, provide file system, networking, I/O services, and provide a user interface functionality, such as a graphical user interface ("GUI"), among other things.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present. The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
   one or more non-transitory computer storage mediums configured to store computer-executable instructions; and
   one or more computer hardware processors configured to execute the computer-executable instructions to cause the computer system to:
   generate, from a first data source and based on an ontology, a geographic dataset including data objects with geo-spatial properties based on location information from the first data source;
   generate, using the geographic dataset, a first vector map data layer including map data tiles with map geometry data associated with the data objects;
   generate a mapping between:
   geo-spatial features in a user application on a front-end system relating to geographic areas, and
   the map geometry data included in the map data tiles of the first vector map data layer; and
   in response to receiving, from the user application, a selection of a geo-spatial feature displayed on the front-end system and a request for information related to the selected geo-spatial feature, generate and provide one or more enriched map data tiles to the front-end system, the enriched map data tiles including information of the selected geo-spatial feature, the information being from the first vector map data layer and determined based on the mapping between the selected geo-spatial feature and associated map geometry data of the first vector map data layer.

2. The computer system of claim 1, wherein the geo-spatial features in the user application of the front-end system are displayable geo-spatial features relating to geographical areas.

3. The computer system of claim 1, wherein the geo-spatial features in the user application of the front-end system are not derived from the first data source.

4. The computer system of claim 1, wherein the one or more computer hardware processors are further configured to execute the computer-executable instructions to to cause the computer system to display map geometry data mapped to a selected geo-spatial feature on the user application on the front-end system.

5. The system of claim 1, wherein the map geometry data is representative of a characteristic of people, business, or nature.

6. The system of claim 1, wherein the first data source is not structured based on the ontology.

7. The system of claim 1, wherein the system is operable to create a geographic data set based on an input received from the front-end user system.

8. The system of claim 1, wherein the system further comprises the front-end user system.

9. The system of claim 1, wherein the geographic dataset includes data of two or more different formats including at least one of Well-Known Text or GeoJSON.

10. The system of claim 1, wherein the first vector map data layer includes map geometry data linked to first data objects having temporal data depicting a property related to the respective map geometry at multiple instances in time.

11. A method comprising:
generating, from a first data source and based on an ontology, a geographic dataset including data objects with geo-spatial properties based on location information from the first data source;
generating, using the geographic dataset, a first vector map data layer including map data tiles with map geometry data associated with the data objects;
generating a mapping between:
geo-spatial features in a user application on a front-end system relating to geographic areas, and
the map geometry data included in the map data tiles of the first vector map data layer; and
in response to receiving, from the user application, a selection of a geo-spatial feature displayed on the front-end system and a request for information related to the selected geo-spatial feature, generating and providing one or more enriched map data tiles to the front-end system, the enriched map data tiles including information of the selected geo-spatial feature, the information being from the first vector map data layer and determined based on the mapping between the selected geo-spatial feature and associated map geometry data of the first vector map data layer.

12. The method of claim 11, wherein the geo-spatial features in the user application of the front-end system are displayable geo-spatial features relating to geographical areas.

13. The method of claim 11, wherein the geo-spatial features in the user application are not derived from the first data source.

14. The method of claim 11, further comprising displaying map geometry data mapped to a selected geo-spatial feature on the user application on the front-end system.

15. The method of claim 11, further comprising:
generating, from a second source, a second geographic dataset based on data objects representative of second data from the second source and having at least one geo-spatial property based on respective location from the second source that corresponds to the second data;
generating a second vector map data layer based on the ontology using the second geographic dataset, the second vector map data layer including second map data tiles having map geometry data associated with the data objects representative of the second data from the second source, each second map data tile corresponding to a portion of a geographic area represented by the second vector map data layer;
generating a mapping between geo-spatial features in the user application and corresponding map geometry data in the second vector map data layer; and
in response to a request from the front-end user system application for information related to selected map geometry data in the second vector map data layer, generating and providing second one or more enriched map data tiles of the second vector map data layer to the front-end system, the second enriched map data tiles of the second vector map data layer including map geometry data and information from data objects that are associated with the selected map geometry data in the second vector map data layer by the ontology.

16. The method of claim 15, further comprising displaying map geometry data and information from data objects that are associated with the selected map geometry data in the second vector map data layer.

* * * * *